No. 832,439. PATENTED OCT. 2, 1906.
R. WILLETTS.
GEARING.
APPLICATION FILED AUG. 3, 1905.
2 SHEETS—SHEET 1.
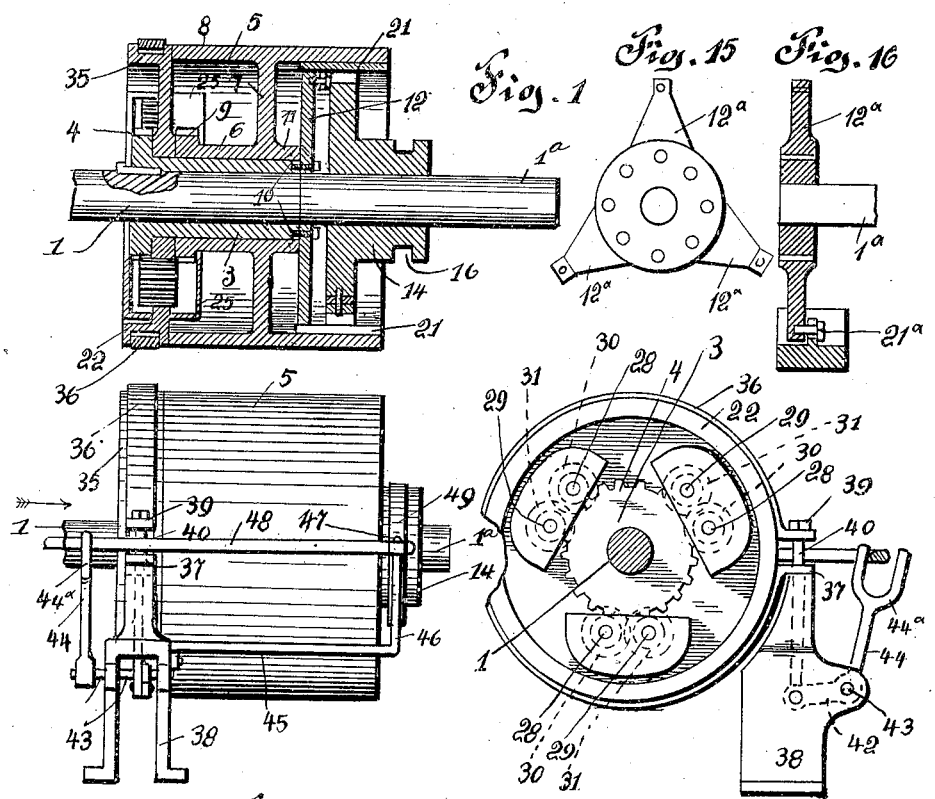
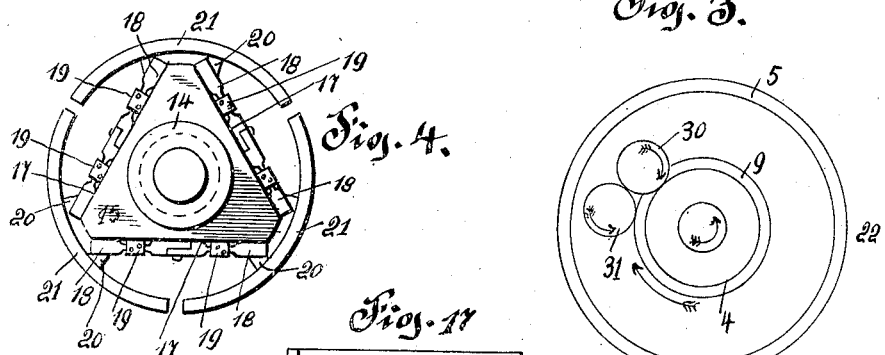
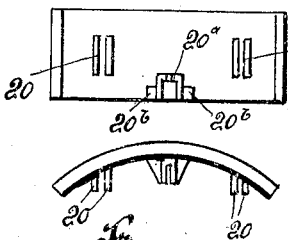
Witnesses:
O. Klostermann
R. N. Butler
Inventor.
Reuben Willetts.
by N. C. Evert & Co.
Attorneys.

No. 832,439. PATENTED OCT. 2, 1906.
R. WILLETTS.
GEARING.
APPLICATION FILED AUG. 3, 1905.
2 SHEETS—SHEET 2.
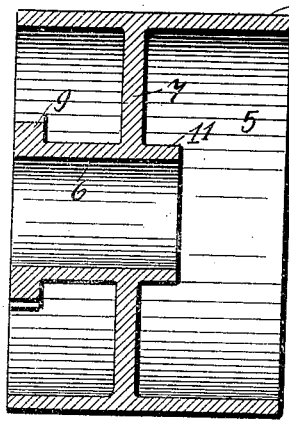
Fig. 6.
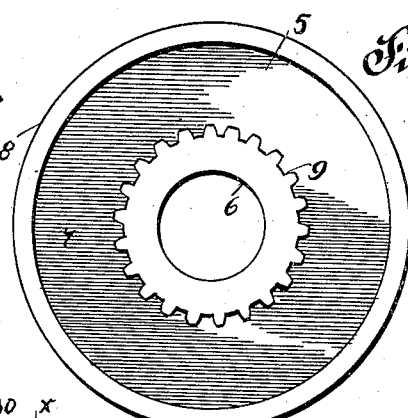
Fig. 7.
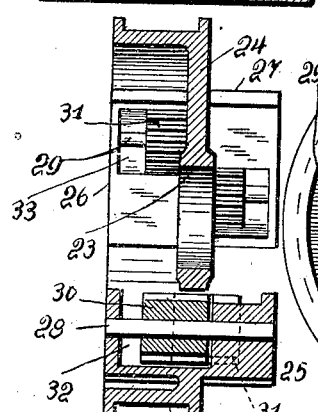
Fig. 9.
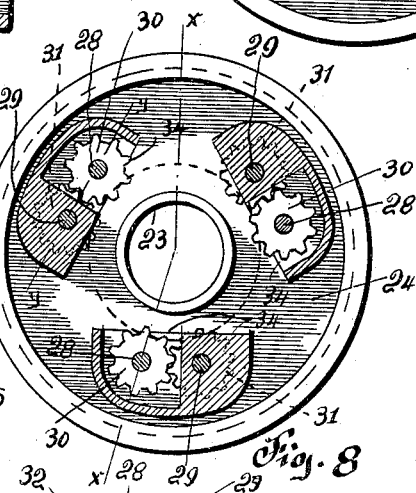
Fig. 8.
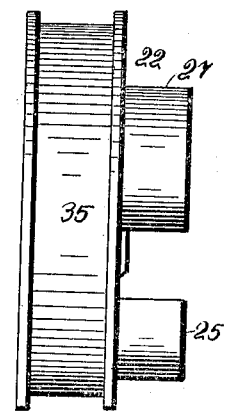
Fig. 10.
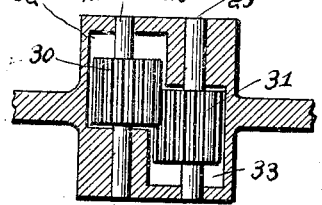
Fig. 11.
Fig. 12.
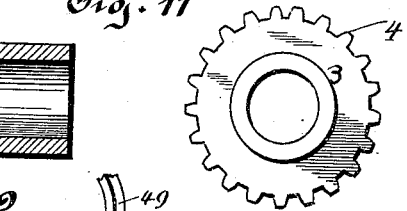
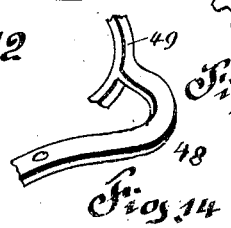
Fig. 13.
Fig. 14.
Witnesses:
C. Klostermann
R. F. Butler
Inventor.
Reuben Willetts
by N. C. Evert & Co.
Attorneys.

UNITED STATES PATENT OFFICE.

REUBEN WILLETTS, OF BUTLER, PENNSYLVANIA.

GEARING.

No. 832,439.

Specification of Letters Patent.

Patented Oct. 2, 1906.

Application filed August 3, 1905. Serial No. 272,538.

*To all whom it may concern:*

Be it known that I, REUBEN WILLETTS, a citizen of the United States of America, residing at Butler, in the county of Butler and State of Pennsylvania, have invented certain new and useful Improvements in Gearing, of which the following is a specification, reference being had therein to the accompanying drawings.

This invention relates to certain new and useful improvements in clutch mechanism; and the primary object of the invention is to provide a novel form of clutch mechanism adapted to be used upon a shaft, said clutch mechanism being so constructed that it can be rotated with the shaft, rotated in a reverse direction to the shaft, and permitting the shaft to rotate independently of the clutch mechanism. This last-named position, which I will hereinafter term an "intermediate" position, is particularly novel, owing to the fact that the clutch mechanism can be used upon the end of a shaft from which it is desired to obtain power.

My invention is particularly applicable to well-drilling machines, especially the engine which operates the drill and hoisting mechanism of a well. It has been the practice to locate such an engine a considerable distance away from the derrick or the well-hole, and gas-engines are used to a considerable extent to operate the mechanism above mentioned. Heretofore it has been impossible to reverse the operation of the engine and the mechanism above mentioned without a cessation of operation, and in view of this I have constructed my improved clutch mechanism for use in connection with gas-engines, although I do not care to confine my improved clutch to this specific use, as it is applicable to other types of engines and mechanisms.

My invention further aims to provide a clutch mechanism composed of few parts, not liable to damage by constant use, and in this connection I have devised a construction which will insure a perfect coöperation of each and every part of the clutch mechanism. I have also provided novel means for controlling the operation of my improved clutch mechanism, these means being actuated either in close proximity to the clutch mechanism or a considerable distance away from the clutch, as would be the case if my improved clutch mechanism was used in connection with well-drilling machinery.

The invention finally consists in the novel construction, combination, and arrangement of parts which will be hereinafter more fully described, and then specifically pointed out in the claims, and, referring to the drawings as-companying this application, like numerals of reference designate corresponding parts throughout the several views, in which—

Figure 1 is a vertical sectional view of the clutch mechanism as applied to the end of a shaft. Fig. 2 is a side elevation of the same. Fig. 3 is an end view looking in the direction of the arrow of Fig. 2. Fig. 4 is a view of the opposite end of the clutch mechanism, a portion of the same being broken away. Fig. 5 is a detail diagrammatic view of a portion of the clutch mechanism. Fig. 6 is a vertical sectional view of a pulley used in connection with the clutch mechanism. Fig. 7 is an end view of the same. Fig 8 is an end view, partly in section, of a brake-wheel. Fig. 9 is a sectional view taken on the line $x\ x$ of Fig. 8. Fig. 10 is a side elevation of the brake-wheel. Fig. 11 is a fragmentary horizontal sectional view on the line $y\ y$ of Fig. 8. Fig. 12 is a longitudinal sectional view of a sleeve employed in connection with the clutch mechanism. Fig. 13 is an end view of the same. Fig. 14 is a detail perspective view of a lever employed in the operation of my improved clutch mechanism. Fig. 15 is an end view of a plate employed in connection with the shoes of the clutch mechanism. Fig. 16 is a vertical sectional view of the same. Fig. 17 is an underneath plan of a shoe. Fig. 18 is an edge view of the same.

In the accompanying drawings I have illustrated the end of a shaft 1, which represents a drive-shaft of an engine or the armature of a motor or may represent a shaft revolved from a suitable source of power. In putting my invention into practice I mount upon the shaft 1 a sleeve 3, adapted to revolve with said shaft. The one end of the sleeve 3 is flanged and formed into a gear-wheel 4, (see Figs. 12 and 13,) the object of which will be presently described. Loosely mounted upon the sleeve 3 is a pulley 5, said pulley consisting of a hub portion 6, a web portion 7, and a rim or peripheral portion 8. The one end of the hub portion is flanged and formed into a gear-wheel 9, said wheel lying in a plane horizontal with the edge of the rim 8, while the other end of said hub portion is considerably shorter in order to accommodate a portion of the clutch mechanism within the pulley 5. Secured by a plurality of screw-bolts 10 to the end of the sleeve 3 is a plate 12, which is provided with outwardly-extending pierced arms 12ª 12ª. Centrally of said plate is an outwardly-extending stub-shaft 1ª.

Slidably mounted upon the shaft 1ª within the pulley 5 is a collar 14, this collar being adapted to revolve with the shaft 1ª. The inner end of the collar is provided with a triangular head 15, while the opposite end of the collar is provided with an annular groove 16. Pivotally connected centrally of the angularly-disposed sides 17 of the triangular head 15 are toggle-levers 18, said levers being provided with turnbuckles 19, whereby they may be lengthened or shortened. The toggle-levers 18 are adapted to coincide and lie in engagement with the angularly-disposed sides 17 of the head 15, and their ends are pivotally connected to lugs 20 20, carried by the inner faces of the substantially arc-shape shoes 21. In the present illustration I have shown three shoes which are adapted to engage the inner wall of the rim 8, their arrangement being substantially circular and having their minimum diameter less than the inner diameter of the rim 8, while their maximum diameter is equivalent to the inner diameter of the rim. In some instances I may find it advisable to employ more than three gripping-shoes, in which case the collar 14 would be removed and a collar having angularly-disposed faces to accommodate four, five, or six sets of toggle-levers, as the case may be, employed. Before further describing my improved clutch mechanism I desire to call particular attention to the arrangement of the toggle-levers and the head 15 relative to the gripping-shoes 21. When the collar 14 revolves with the shaft 1ª, the stress and strain exerted upon the toggle-levers will be relieved and compensated for by the angularly-disposed sides 17 of the head 15 bracing and engaging the toggle-levers. In either direction at which the head 15 is rotated the strain and stress of the load carried by the shoes 21 will be relieved at three points equidistantly spaced relative to the axis of the head 15. It will also be observed that the toggle-levers 18 are connected to the shoes 21 at each side of the center of said shoes, consequently bracing and insuring a more positive grip of the entire surface of the shoe than if the toggle-levers were connected directly to the center of said shoe. In practice I may even connect the ends of the toggle-levers close to the ends of the shoes and in this manner produce a positive coöperation of the entire surface of each shoe. To steady the shoes 21 and insure a perfect positioning of the same relative to the pulley with which it engages, I provide each shoe with a centrally-depending slotted member 20ª, which is braced by webs 20ᵇ, these members being preferably located at the rear edges of said shoes. Screw-bolts 21ª are secured in the pierced ends of the arms 12ª 12ª of the plate 12, and the shanks of said screws are adapted to ride in the slots of the members 20ª and guide the shoes in their movement, at the same time relieving the strain upon the toggle-levers 18. By referring to Figs. 15 and 16 of the drawings it will be observed that I have illustrated one of the arms 12ª of the plate 12 as connected to the shoe, also that the plate 12 is provided with a number of arms corresponding to the number of shoes employed, it of course being understood that where two shoes are employed two diametrically-opposed arms would only be necessary.

In order that the operation of my improved clutch, which will be presently described, may be clearly understood, it is well to note that the plate 12 and the shaft 1ª revolve with the sleeve 3, consequently the shoes 21 and the collar 14, and as the pulley 5 is loosely mounted upon the sleeve 3 the pulley is free to rotate independently of the sleeve 3, except when the shoes 21 engage the pulley.

In connection with the parts just described I employ a brake-wheel 22, the hub portion 23 of which is mounted upon the sleeve 3 between the gear-wheels 4 and 9, as clearly illustrated in Fig. 1 of the drawings. The brake-wheel is of a peculiar construction, which is best seen in Figs. 8 to 11, inclusive, where it will be observed that the web portion 24 of the wheel is cut away to form a plurality of oblong gear-casings 25. These gear-casings extend into the wheel, as indicated at 26, and outwardly upon the web side of the wheel, as indicated at 27. The casings are arranged equidistant apart, and the longitudinal axis of each casing is parallel with the hub portion 23 of the brake-wheel. In each casing are journaled shafts 28 and 29, these shafts being arranged parallel to one another, as clearly illustrated in Fig. 11 of the drawings. Upon the shafts 28 and 29 are mounted gear-wheels 30 and 31, respectively. Each casing is provided with two compartments 32 and 33 to accomodate the gear-wheels 30 and 31, the compartment 32 being constructed in one side of the casing 25, while the compartment 33 is constructed in the opposite side, but intersecting the compartment 32 at the center of the casing 25. In this manner the gear-wheels 30 and 31 are permitted to mesh with one another, and it will be observed that the flat side of each one of the casings 25 is cut away adjacent to the compartments 32 and 33, as indicated at 34, whereby the periphery of each gear-wheel will protrude slightly beyond its casing. The gear-wheels 30 are adapted to mesh with the gear-wheel 9 of the pulley 5, while the gear-wheels 31 are adapted to mesh with the gear-wheel 4 of the collar 3.

In order to control the movement of the brake-wheel 22, I provide the same with a peripheral groove 35, and in this groove I mount a resilient band 36, the one end of which is fixed, as indicated at 37, to a suitable standard 38, mounted adjacent to the brake-wheel. The opposite end of the resilient band is connected, as indicated at 39, to a rod 40, that extends downwardly through an opening 41, formed in the end 37 of the band and the standard 38. The rod 40 is pivotally connected to a crank-arm 42, carried by a shaft 43, journaled in the standard 38, this shaft being provided with a suitable crank arm or lever 44, having a bifurcated end 44$^a$.

To operate the shoes 21 in conjunction with the brake-wheel 22, I provide the standard 38 with an outwardly-extending frame 45, having an upwardly-bent end 46. Pivotally connected, as at 47, to the end 46 is a lever 48, having an angularly-disposed bifurcated end 49, that engages in the annular groove 16 of the collar 14. The other end of the lever 48 extends through the bifurcated end 44$^a$ of the lever 44 and may be connected to a suitable operating-cord. (Not shown.)

In order that the operation of the various parts of my improved clutch may be readily understood, I have illustrated in Fig. 5 of the drawings a diagrammatic view of the intermeshing wheels or gears of the clutch, and for convenience and clearness of illustration I have enlarged the gear-wheel 9 and positioned one of the gear-wheels 30 whereby the meshing of the wheel with the gear-wheel 9 can be readily seen, this view being simply used to assist in describing the operation of my improved clutch mechanism.

As heretofore stated, the clutch mechanism operates under three conditions, depending upon the position of the adjustable parts of the clutch mechanism. We will assume that the shaft 1 is revolved in the direction of the arrow of Fig. 14 and that the band 36 is holding the brake-wheel stationary. It will be observed that when the band 36 is in engagement with the brake-wheel the shoes 21 are moved out of engagement with the pulley 5. This is accomplished through the medium of the shaft 43, crank-arms 42 and 44, and lever 48. As the shaft 1 revolves in the direction of the arrow of Fig. 14 the gear-wheel 4, which meshes with the gear-wheels 30, will revolve said wheels in the direction of the arrow of the gear-wheel 30, and as these wheels mesh with the gear-wheels 31 said wheels will be revolved in the direction of the arrow indicated upon the wheel 31. These wheels 31, meshing with the gear-wheel 9 of the pulley 5, will revolve the gear-wheel and pulley in the direction of the arrow indicated adjacent to the gear-wheel 9, revolving said gear-wheel and the pulley 5 in a reverse direction to that in which the shaft 1 is rotated. If a machine or piece of mechanism is operated by a belt from the pulley 5, it will be operated in a reverse direction to that in which the shaft is rotated. Should it be desired to rotate the pulley 5 in the same direction as the shaft 1, the shaft 43 is rotated to throw the band 36 out of engagement with the brake-wheel and to move the collar 14 toward the pulley 5, which, through the medium of the toggle-levers 18, moves the shoes 21 in engagement with the pulley, causing said pulley to rotate with the shaft 1. The intermediate position of the operating parts of my improved clutch mechanism can be obtained by rotating the shaft 43 to such a position that neither the brake-shoes 21 nor the band-wheel 36 will tightly engage their respective elements. Consequently the shaft 1 can be revolved independently of the clutch mechanism.

It will be seen from the construction of my improved clutch mechanism that I have devised a reversible clutch mechanism which can be easily and quickly operated in either direction, and it is thought from the foregoing that the construction, operation, and advantages of the herein-described clutch will be apparent without further description, and various changes in the form, proportion, and minor details of construction may be resorted to without departing from the spirit of the invention or sacrificing any of the advantages thereof.

What I claim, and desire to secure by Letters Patent, is—

1. In a clutch of the type described, the combination with a main shaft, of a sleeve carried by said shaft, a gear-wheel carried by said sleeve, a pulley mounted upon said sleeve, a gear-wheel carried by the hub portion of said pulley, a brake-wheel mounted upon said sleeve between said gear-wheels, intermeshing gears journaled in said brake-wheel, some of said gears meshing with the gear-wheel carried by the sleeve, while the other of said gears mesh with the gear-wheel of the pulley, a plate carried by said sleeve, a stub-shaft carried by said plate, a collar slidably mounted upon said stub-shaft, a triangular head carried by said collar, toggle-levers pivotally connected to said head and parallel with the edges thereof, shoes connected to said toggle-levers and engaging said pulley, a brake-band surrounding said brake-wheel, means to alternately actuate said band and said shoes, substantially as described.

2. The combination with a main shaft, of a sleeve mounted upon said shaft, a gear-wheel carried by said sleeve, a pulley loosely mounted upon said sleeve, a gear-wheel carried by the hub portion of said pulley, a brake-wheel loosely mounted upon said sleeve between said gear-wheels, intermeshing gear-wheels journaled in said brake-wheel and adapted to mesh with said gear-wheels, a brake-band surrounding said brake-wheel, a stub-shaft supported by said sleeve, a collar slidably mounted upon said stub-shaft, a head carried by said collar, toggle-levers pivotally mounted on said head and parallel to the edges of said head, shoes connected to said toggle-levers, means to adjust said levers, and means to alternately actuate said band-wheel and said shoes, substantially as described.

3. The combination with a drive-shaft, of a sleeve mounted upon said shaft, a gear-wheel carried by said sleeve, a pulley-wheel loosely mounted upon said sleeve, a gear-wheel carried by the hub portion of said pulley-wheel, a brake-wheel loosely mounted upon said sleeve between said gear-wheels, a collar mounted on said shaft, a head carried by said collar, shoes adjustably connected to said head and adapted to engage said pulley-wheel, a plate connected to said sleeve, a stub-shaft carried by said plate, said collar being mounted on said stub-shaft, and means to hold said brake-wheel and rotate said pulley in an opposite direction from said shaft and means actuated by the first-named means to move said shoes out of engagement with said pulley, substantially as described.

4. The combination with a drive-shaft, of a sleeve mounted upon said shaft, a gear-wheel carried by said sleeve, a pulley loosely mounted upon said sleeve, a gear-wheel carried by the hub portion of said pulley, a brake-wheel mounted upon said sleeve, between said gear-wheels, means to hold said brake-wheel and a plurality of intermeshing gear-wheels carried by said brake-wheel and meshing respectively with the gear-wheel carried by the sleeve and the gear-wheel carried by the pulley to impart a reverse rotary movement to said pulley from said shaft, and means actuated alternately with the first-named means to grip said pulley.

5. The combination with a drive-shaft, of a pulley loosely mounted upon said shaft, a gear-wheel carried by said pulley, a brake-wheel loosely mounted upon said shaft, a second gear-wheel carried by said shaft, means to grip said brake-wheel, means carried by the brake-wheel and engaging said second gear-wheel to revolve said pulley in an opposite direction from said shaft, means actuated by the release of the brake-wheel to grip said pulley and rotate it in the same direction as said shaft, substantially as described.

6. The combination with a drive-shaft, a sleeve mounted on said drive-shaft, and a gear-wheel carried by said sleeve, of a pulley loosely mounted on said sleeve, a gear-wheel carried by said pulley, a brake-wheel mounted on the sleeve between the gear-wheel carried by the sleeve and the gear-wheel carried by the pulley, means to grip said brake-wheel, a plurality of gear-wheels mounted on shafts disposed parallel with said drive-shaft and carried by said brake-wheel to impart a rotary movement to said pulley, reverse to the movement of said shaft, and means alternately actuated with the first-named means to grip said pulley and rotate it in the same direction as said shaft, substantially as described.

7. The combination with a drive-shaft, a sleeve fixed on said shaft, a pulley loosely mounted on said sleeve and means for connecting the pulley with said shaft so as to cause it to rotate therewith, of a brake-wheel loosely mounted on the sleeve between the end of the sleeve and the hub of the pulley, a gear-wheel carried by the sleeve, a gear-wheel carried by the pulley, a plurality of gear-wheels carried by the brake-wheel and extending through the web thereof, said last-named gear-wheels intermeshing one with the other, and one of said gear-wheels meshing with the gear-wheel on the sleeve while the other of said last-named gear-wheels meshes with the gear-wheel on the pulley.

In testimony whereof I affix my signature in the presence of two witnesses.

REUBEN WILLETTS.

Witnesses:
   TEUSARD DE WOLFE,
   CHAS. H. MILLER.